United States Patent Office 3,196,292
Patented July 20, 1965

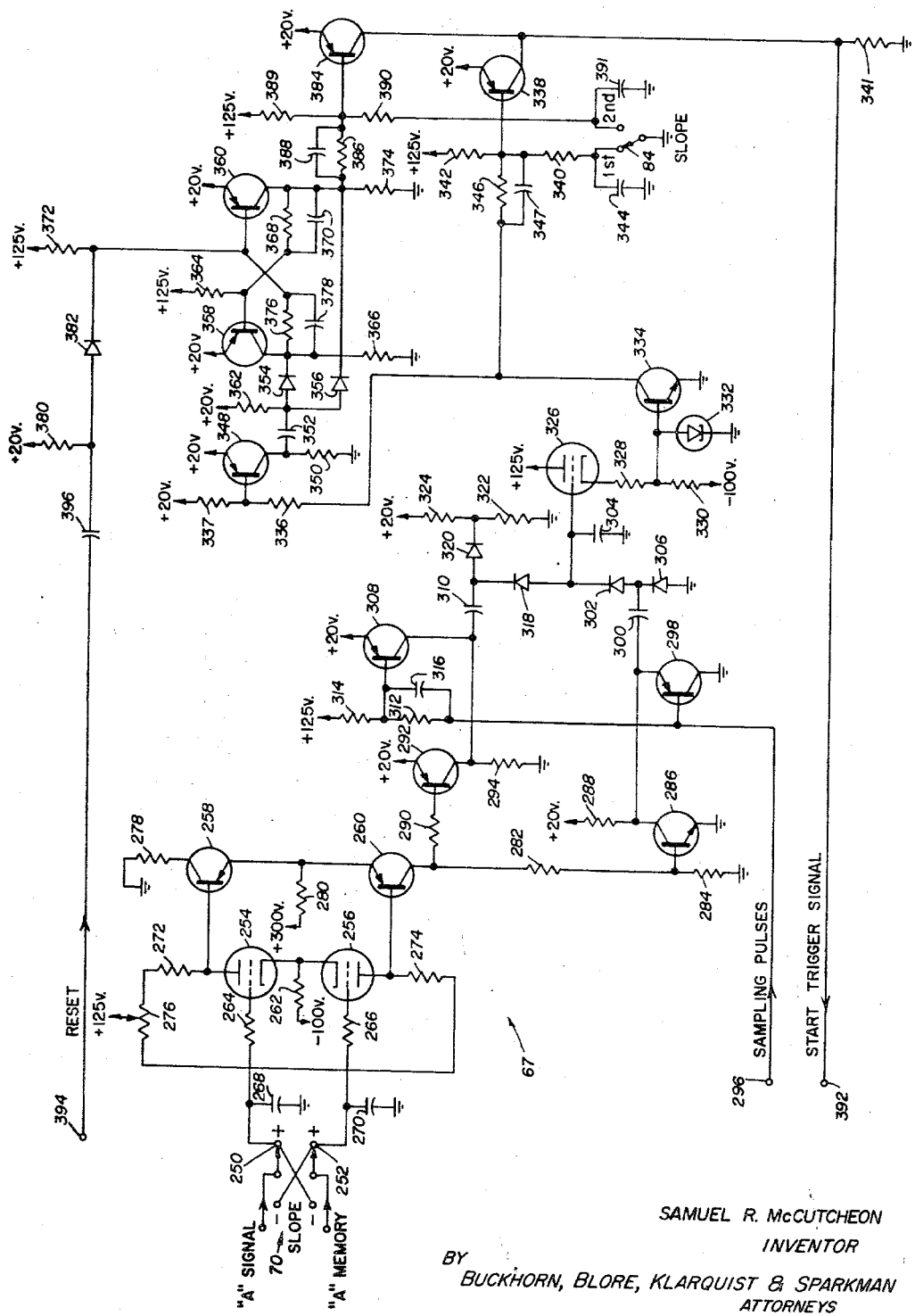

3,196,292
NOISE SUPPRESSOR CIRCUIT
Samuel R. McCutcheon, Aloha, Oreg., assignor to Tektronix, Inc., Beaverton, Oreg., a corporation of Oregon
Original application June 15, 1962, Ser. No. 202,814. Divided and this application Feb. 26, 1964, Ser. No. 352,712
8 Claims. (Cl. 307—88.5)

The subject matter of the present invention relates generally to electrical circuits for measuring the time or voltage between two selected points on electrical signal waveforms under investigation, and in particular to a noise suppressor circuit which enables the output signal of a voltage comparator circuit to produce a trigger signal at a time corresponding to one of such two points even though the input signal to such comparator contains a noise signal.

The noise suppressor circuit of the present invention is especially useful when employed as part of a cathode ray oscilloscope, such as in the circuit of my copending United States patent application, Serial No. 202,814, entitled "Stop-Start Logic Circuit," filed June 15 1962, of which the present application is a division, to determine the characteristics of the electrical signal waveforms displayed on the fluorescent screen of the cathode ray tube in such oscilloscope. Conventional cathode ray oscilloscopes display the electrical signal under investigation on an illuminated graticule scale which is usually positioned over the fluorescent screen of such oscilloscope. In order to determine the time or voltage between selected points on such waveforms it is necessary for the operator to count the number of 1-centimeter graticule lines between such points and then to multiply this by setting on the time per cm. sweep rate control for the horizontal sweep generator in the case of time measurements, or by the setting on the volt per cm. amplitude control of the vertical preamplifier in the case of voltage measurements. However, this is a laborious process which takes considerable time and is subject to human error since it requires reading the distance accurately on the graticule scale which is usually only divided into centimeters with 2-millimeter markers on the centerlines, reading the correct control setting and performing the proper multiplication process correctly. In addition, the graticule scale is often positioned outside the cathode ray tube envelope so that such graticule is spaced from the fluorescent screen of such tube by the glass face plate of such envelope. As a result of this spacing a parallax error is introduced when the above distance readings are made from the graticule of the waveform image on the fluorescent screen. The logic circuit of my previous application eliminates these disadvantages when employed with a cathode ray oscilloscope by providing an oscilloscope which automatically "reads out" the correct time and voltage characteristics of the input signal waveforms under investigation in a fast and accurate manner. This is accomplished by comparing the input signal with a D.C. reference voltage which is a predetermined percentage of the voltage amplitude of such input signal set to correspond to one of the measuring points on the waveform, to produce an output signal when the input signal exceeds such reference voltage which causes a trigger signal to be generated so that such trigger signal corresponds in time to such one measuring point. The read-out oscilloscope may be a dual trace oscilloscope which presents two waveforms on the fluorescent screen of the cathode ray tube in such oscilloscope so that the time relationship between these two waveforms may be measured as well as the time and voltage characteristics of each of such waveforms. Also, the oscilloscope may be a sampling type of cathode ray oscilloscope so that the high frequency waveforms displayed on the fluorescent screen of such oscilloscope are sample waveforms made up of different portions or samples of successive repetitive signals. Certain circuits of one such sampling oscilloscope are disclosed in greater detail in copending U.S. patent application Serial No. 131,647, entitled Pulse Generator Circuit, filed on August 15, 1961, by John V. Rogers.

Briefly one embodiment of the noise suppressor circuit of the present invention includes a pair of gating or switching transistors having their inputs connected to the output of a comparator circuit and biased so that one of such transistors is conducting and the other non-conducting. A storage capacitor is connected to the gating transistors through a pair of coupling capacitors and two pairs of voltage limiting and clipping diodes which are connected to provide two different signal paths to transmit voltage pulses of opposite polarity to such storage capacitor through different pairs of such diodes. A source of standard rectangular voltage pulses of the same width, amplitude and frequency is connected through an emitter follower transistor to the common connection of one of the switching transistors and one of such coupling capacitors, and connected through an inverter transistor to the common connection of the other switching transistor and coupling capacitor. The voltage pulses are transmitted through either the switching transistors to ground or the pair of diodes to the storage capacitor depending upon whether such transistors are conducting. When the input signal voltage on one input terminal exceeds the reference voltage on the other input terminal of the comparator, the voltage of the output signal of the comparator changes and causes the conductivity of the switching transistors to reverse. This causes voltage pulses of different polarity than that initially applied, to be applied to the storage capacitor so that such capacitor charges in a stairstep manner from a lower limit voltage set by the voltage drop across one pair of diodes to an upper limit voltage set by the other pair of diodes. The storage capacitor is connected to the input of a cathode follower tube whose output is connected to a tunnel diode to apply the stairstep voltage produced on such capacitor to such tunnel diode. The tunnel diode is connected as a bistable multivibrator biased in its low voltage state at a low level of current conduction so that it will not be triggered until the storage capacitor voltage increases three voltage steps. If the input signal to the comparator has a noise signal component such input signal could momentarily exceed the reference voltage due to such noise and produce a comparator output signal which causes charging pulses to be transmitted to the storage capacitor at the wrong time. However, the duration of the noise signal is only equal to the time of one, or at the most two, charging pulses so that the storage capacitor voltage does not reach the third stairstep level and the noise signal cannot cause the tunnel diode to be triggered at the wrong time. Thus the output signal of such tunnel diode is always generated at the proper time to indicate when the input signal voltage exceeds the reference voltage. This output signal can then be employed to produce a trigger signal for another part of the stop-start logic circuit to measure the waveform characteristic under investigation since such trigger signal is related in time to one of the two points on the waveform between which the measurement is taken.

It is therefore one object of the present invention to provide an improved electrical circuit for generating trigger signals at predetermined times corresponding to points on an input signal waveform.

Another object of the invention is to provide a noise suppressor circuit which operates in a simple and reliable manner.

A further object of the invention is to provide an improved noise suppressor circuit for a signal comparator circuit, which produces an output signal which is accurately related in time to a change in polarity of the input terminals of the signal comparator even though an input signal of such comparator may contain a noise signal component.

An additonal object of the present invention is to provide an improved noise suppressor circuit which employs a plurality of standard positive and negative voltage pulses to charge a storage capacitor through a pair of gating devices which are opened and closed in response to an input signal, so that a stairstep voltage is formed on such capacitor which causes an output signal to be produced when such input signal changes polarity and eliminates any time jitter in such input signal.

Other objects and advantages of the present invention will be apparent from the following detailed description of a preferred embodiment thereof shown in the attached drawing of which the figure is a schematic diagram of a signal suppressor circuit of the present invention.

A signal comparator circuit 67 employing the noise suppressor circuit of the present invention is shown as having a slope switch 70 connected to the input of such comparator circuit. The input signal to the start signal comparator from the start switch of my copending United States patent application 202,814, is transmitted through the + or − slope switch 70. In the switch positions shown, the "A" signal is transmitted through an input terminal 250 and the "A" memory D.C. reference voltage is transmitted through an input terminal 252. These input signals are transmitted to a comparator amplifier including a pair of difference amplifiers including first and second triode vacuum tubes 254 and 256, and first and second PNP type transistors 258 and 260. The first difference amplifier contains vacuum tubes 254 and 256, which have a common cathode connection to a source of negative D.C. bias voltage through a common bias resistor 262. The input signals are applied to the grids of tubes 254 and 256 through coupling resistors 264 and 266 connected to input terminals 250 and 252, respectively, which are A.C. bypassed to ground through bypass capacitors 268 and 270, respectively. The tubes 254 and 256 are connected at their anodes to a source of positive D.C. bias voltage through load resistors 272 and 274, respectively, which are connected in series with a variable resistance potentiometer 276, whose movable contact is connected to such source of bias voltage and may be varied in order to balance the difference amplifier. The second difference amplifier contains transistors 258 and 260 and is connected in cascade with the first difference amplifier. The output signal from the anode of the first tube 254 is applied to the base of the first transistor 258 whose collector is connected to ground through a load resistor 278 and whose emitter is connected in common with the emitter of the second transistor 260 to a source of positive D.C. bias voltage through a common bias resistor 280. The output signal from the anode of the second tube 256 is applied to the base of the second transistor 260 whose collector is connected to ground through a pair of series connected load resistors 282 and 284.

Two output signals are taken from the second difference amplifier at the collector circuit of transistor 260. One is taken across load resistor 284 and supplieed as an input signal to the base of a first NPN type gating or switching transistor 286 whose emitter is connected to ground and whose collector is connected to a source of positive D.C. bias voltage through a load resistor 288. The second output signal is taken across both load resistors 282 and 284 and transmitted through a coupling resistor 290 to the base of a second PNP type gating or switching transistor 292 having its emitter connected to a source of positive D.C. bias voltage and its collector connected to ground through a load resistor 294. In the switch position shown, the input terminal 252 is connected to receive the positive D.C. voltage from the 10% reference voltage of the "A" memory potentiometer and the input terminal 250 is connected to receive the "A" vertical signal from the vertical amplifier, as shown in my copending United States patent application 202,814. As this vertical signal increases from zero toward the 10% reference voltage, input terminal 250 is negative with respect to input terminal 252 so that transistor 260 is conductive and the output voltage signal at the collector of such transistor is at its most positive potential. This turns "On" switching transistor 286 and turns "Off" switching transistor 292. However, once the vertical signal voltage increases above the 10% reference voltage applied to input terminal 252, the input terminal 250 goes positive with respect to terminal 252 and the transistor 260 becomes non-conductive to provide a negative voltage signal on its collector which switches transistor 286 "Off" and transistor 292 "On." Thus either one or the other of transistors 286 and 292 are always conducting, depending upon the polarity of input terminal 250 with respect to input terminal 252.

A plurality of narrow standard voltage pulses are applied to the signal comparator circuit through an input terminal 296 which may be connected either to the sampling pulse generator or to the voltmeter clock of my copending patent application referred to above. The voltage pulses applied to the terminal 296 are the sampling pulses when time measurements are being taken on a sampling oscilloscope. These sampling pulses which may be +1.5 volts high and 1 microsecond wide with a variable frequency, are transmitted to a PNP emitter follower transistor 298 whose collector is connected to ground and whose emitter is connected to the collector of switch transistor 286 and to a coupling capacitor 300. When switching transistor 286 is conducting due to a positive signal on the collector of transistor 260, its emitter to collector circuit presents very little resistance so that the sampling pulses developed on the emitter of transistor 298 are transmitted to ground through such switching transistor. However, when switching transistor 286 is nonconducting due to a negative signal on the collector of transistor 260, the sampling pulses transmitted to the emitter of transistor 298 cannot be conducted to ground except through load resistor 288, so these positive rectangular sampling pulses are then transmitted as a differentiated pulse signal containing positive and negative spikes through the coupling capacitor 300. This coupling capacitor is connected to the anode of a coupling diode 302 whose cathode is connected to the upper plate of a storage capacitor 304 whose lower plate is grounded and which stores the positive spikes of these sampling pulses after they have been differentiated by coupling capacitor 300 and transmitted as positive pulses of about +1.5 volts through such coupling diode. The negative spike portions of the differentiated pulse signal are transmitted to ground through a clipping diode 306 whose cathode is connected to the anode of diode 302.

The sampling pulses are also transmitted to the base of common emitter amplifier transistor 308 which may be a PNP type transistor whose emitter is connected to a source of positive D.C. bias voltage and whose collector is connected to the collector of transistor 292 and to a coupling capacitor 310. The sampling pulses are transmitted through a coupling resistor 312 to the base of transistor 308 that is also connected to a source of positive D.C. bias voltage through a bias resistor 314 forming a voltage divider with resistor 312 which is shunted by a bypass capacitor 316. The sampling pulses are inverted and transmitted to the collector of transistor 308 as negative pulses due to the phase inversion of such transistor and are transmitted to ground through the emitter to collector circuit of transistor 292 when such transistor is conducting. However, when switching transistor 292 is nonconducting due to a positive signal on the collector of transistor 260 sampling pulses are transmitted through the coupling capacitor 310 as a differentiated pulse signal having negative and positive spike portions. The coupling capacitor 310 is connected to the cathode of a coupling diode 318 whose anode is connected to the upper plate of the storage capacitor 304 so that the negative spike of the differentiated sampling pulse is transmitted as a negative pulse of about −1.5 volts through the coupling diode 318 to such storage capacitor 304. The positive spike of such differentiated sampling pulse is transmitted through a clipping diode 320 whose anode is connected to the cathode of coupling diode 318 and whose cathode is connected to ground through a resistor 322 which forms a voltage divider with another resistor 324 connected to a source of positive D.C. bias voltage so that their common connection is normally biased at about +4 volts D.C. The switching voltage for each one of the diodes 302, 306, 318 and 320 is about 0.75 volt. Therefore, the voltage limits to which the storage capacitor 304 can charge are −1.5 volts and +5.5 volts, since −1.5 volts is the total voltage to ground across diodes 302 and 306 and +5.5 volts is the total voltage to ground across diodes 318 and 320 and resistor 322. The resultant signal developed on the memory capacitor is in the form of a stairstep voltage.

The stairstep voltage of the storage capacitor 304 is applied to the grid of a cathode follower amplifier vacuum tube 326 whose anode is connected to a source of positive D.C. bias voltage and whose cathode is connected to a source of negative D.C. bias voltage through a pair of series connected load resistors 328 and 330. The signal developed across load resistor 330 is applied to the anode of a tunnel diode 332 which is connected as a bistable multivibrator with its cathode connected to ground so that it is normally biased in a low voltage state. It takes at least three consecutive positive spike pulses on capacitor 304 to charge such capacitor to a stairstep voltage level sufficient to increase the current flow through tube 326 enough to switch the tunnel diode 332 to its high voltage stable state. Thus even if the "A" signal contains a noise signal it will not cause the tunnel diode to be triggered incorrectly because the duration of such noise signal is less than the time required for three sampling or clock pulses. In this manner the noise suppressor circuit including transistors 286, 292, 298 and 308, diodes 302, 306, 318 and 320, capacitors 300, 304 and 310, tube 326 and tunnel diode 332, produces an output signal on the anode of the tunnel diode which is related in time to the change in relative polarity of the input terminals of the comparator circuit when, for example, the positive input signal on terminal 250 exceeds the positive D.C. reference voltage on terminal 250.

It should be noted that the storage capacitor 304 is initially charged to the lower limit voltage of −1.5 volts and held there by the negative pulses transmitted through diode 318 because switching transistor 292 is normally nonconductive. Thus, three positive pulses of +1.5 volts applied to the storage capacitor through diode 302 when switching transistor 286 is rendered nonconducting, charge such capacitor to about +3.0 volts. Since there is about −1 volt grid bias on tube 326, the voltage on the cathode of such tube is about +4.0 volts at this time. When resistors 328 and 330 are 1.2 kilohms and 75 kilohms, respectively, this voltage causes about 3.33 milliamperes of cathode current to flow through resistor 328 and this current is divided into 1.33 milliamperes through resistor 330 and 2.00 milliamperes through the tunnel diode. This is enough current to trigger the tunnel diode to a high voltage stable state to produce an output signal, since it has a peak current rating of 2.0 milliamps. However, the storage capacitor is charged to the upper limit voltage +5.5 volts by successive pulses to compensate for any decrease in the grid bias voltage of tube 326 and any increase in peak current of the tunnel diode due to aging, component value variation, etc., to insure triggering of such tunnel diode. The storage capacitor is discharged to −1.5 volts by negative pulses when the voltage on input terminal 250 goes negative with respect to the reference voltage on terminal 252 because this causes switching transistor 292 to become nonconducting. As a result of the negative going voltage on the storage capacitor, tunnel diode 332 is reverted to its low voltage stable state and the noise suppressor circuit is ready for another cycle of operation.

The positive step voltage produced by triggering the tunnel diode 332 is transmitted to the base of a common emitter amplifier transistor 334 which may be an NPN type transistor whose emitter is connected to ground and whose collector is connected to a source of positive D.C. bias voltage through a pair of load resistors 336 and 337. The positive step voltage produced by the tunnel diode 332 is inverted by transistor 334 to a negative step voltage having a leading edge which corresponds in time to a point on the "A" vertical signal waveform having the same voltage as the "A" memory reference voltage applied to input terminal 252. If the first slope of this vertical signal waveform is the slope under investigation, the slope switch 84 is switched to the "1st" position shown. This connects the base of a first PNP type output transistor 338 to ground through switch 84 and a biasing resisor 340, and allows the positive D.C. bias voltage on such base to decrease to a less positive value so that such output transistor can be switched "On" by the negative step voltage transmitted from the collector of transistor 334. When output transistor 338 is rendered conducting, it causes current to flow from a positive D.C. voltage source connected at the emitter of such output transistor through an output load resistor 341 connected between its collector and ground to produce an output signal voltage across such load resistor.

The D.C. bias voltage applied to the base of output transistor 338 is determined by the current flow through a voltage divider containing bias resistor 340 and a dropping resistor 342 which is connected to a source of high positive D.C. bias voltage. When slope switch 84 is in its second slope position "2nd," the bias resistor 340 is connected to ground only through a blocking capacitor 344 so that no D.C. current flows in such bias resistor and the positive bias voltage on the base electrode of the output transistor 338 is greater than the negative voltage pulse from transistor 334 so that such output transistor remains nonconducting. However, when the slope switch 84 is in the first slope position "1st," as shown, D.C. current does flow through bias resistor 340 so that the D.C. bias voltage on the base of output transistor 338 drops from that of its normal value to a much less positive voltage. When this happens, the negative voltage pulse transmitted from the collector of transistor 334 through coupling resistor 346, which is shunted by a high frequency bypass capacitor 347, can now switch "On" the output transistor 338 so that it conducts current and produces a positive output voltage pulse across load resistor 341, as discussed above.

The collector of transistor 334 is also connected to the base of an inverter amplifier transistor 348 between load resistors 336 and 337. This inverter transistor 348 may be a PNP transistor having its emitter connected to a source of positive D.C. bias voltage and its collector connected to ground through a load resistor 350. The positive voltage pulse developed upon the collector of transistor 348 due to the voltage pulse produced by tunnel diode 332 is transmitted through a coupling capacitor 352 to the anodes of a pair of coupling diodes 354 and 356 whose cathodes are connected to the collectors of transistors 358 and 360, respectively, which form part of a bistable multivibrator circuit. The coupling diodes 354 and 356 are normally forward biased by having their anodes connected to a source of positive D.C. bias voltage through a bias resistor 362. Transistor 358 may be a PNP type transistor whose emitter is connected to a source of positive D.C. bias voltage and whose base is connected to a source of positive D.C. bias voltage through a bias resistor 364, while the collector of such transistor is connected to ground through a load resistor 366. A positive spike trigger signal produced by differentiation of the positive voltage pulse by capacitor 352, is transmitted through diode 354 to the collector of transistor 358 and through diode 356 to the base of transistor 358 connected in series with a coupling resistor 368 which is shunted by a bypass capacitor 370.

Similarly, transistor 360 may also be a PNP type transistor having its emitter connected to a source of positive D.C. bias voltage, its base connected to a source of positive D.C. bias voltage through a bias resistor 372, and its collector connected to ground through a load resistor 374. The positive trigger signal is applied to the collector of transistor 360 through diode 356 and to the base of transistor 360 through the diode 354 connected in series with a coupling resistor 376 which is shunted by a bypass capacitor 378. Transistor 360 of the bistable multivibrator is normally biased "Off," or nonconducting, by a source of positive D.C. bias voltage through a bias resistor 380 and a coupling diode 382 whose cathode is connected to the base of such transistor. Therefore, when the positive trigger signal is transmitted through diodes 354 and 356, transistor 360 switches "On" and transistor 358 switches "Off." The multivibrator output voltage signal from the collector of transistor 360 must go in a negative direction before an output signal can be obtained across load resistor 341 connected to the collector of a second output transistor 384. Thus, a second triggering pulse is required to trigger the transistors 360 and 358 back to their original "Off" and "On" conditions, respectively, so that the multivibrator output voltage signal goes negative back to zero. This second triggering signal is produced by a second voltage pulse generated by tunnel diode 332 whose leading edge corresponds to a point on the second slope of the "A" vertical signal waveform whose voltage is equal to that of the "A" memory reference voltage connected to terminal 252. Therefore, the storage signal of storage capacitor 304 must run up and run down twice in order to switch the tunnel diode 332 through two complete cycles of bistable multivibrator switching to produce two positive trigger pulses which are transmitted to the second slope bistable multivibrator including transistors 358 and 360.

The multivibrator output signal of this second slope multivibrator is connected to the base of the second output transistor 384 through a coupling resistor 386 which is shunted by a bypass capacitor 388. This output transistor 384 is a PNP type transistor having its emitter connected to a source of positive bias voltage and its collector connected to ground through the common load resistor 341. Also, the second output transistor 384 is similar to the first output transistor 338, in that its base must be connected to ground through the slope switch 84 in the second slope position "2nd" of such switch before the positive D.C. bias voltage on such base is low enough so that transistor 384 can be triggered by the negative going portion of the multivibrator output signal. Thus, while the base of transistor 384 is normally connected to a high positive D.C. reverse bias voltage through a resistor 389 when switch 84 is in the "1st" position shown, it is connected to a low reverse bias voltage across a bias resistor 390 when such switch is in the "2nd" position. A blocking capacitor 391 similar to capacitor 344 is connected in series with resistor 390 so that no D.C. current flows through resistor 390 to ground when switch 84 is in the position shown.

The output signal from the start signal comparator circuit 67 is obtained across the load resistor 341 at the output terminal 392. This output signal is the start trigger signal which triggers the start multivibrator of the start-stop logic circuit of my copending application 202,814. It should be noted that in some instances the second slope multivibrator including transistors 358 and 360 will not be switched back to its original operating condition so that it cannot be triggered by positive pulses. To prevent this from happening, a reset or enabling pulse is applied to the base of transistor 360 through an input terminal 394. This reset pulse may be the —0% zone pulse from the 0% pulse generator of my copending application previously referred to, and such negative reset pulse is differentiated when it is transmitted through a coupling capacitor 396 so that the positive going portion of this negative pulse produces a positive spike signal which is transmitted through the coupling diode 382 to the base of transistor 360 to switch this transistor "Off" if it is not already nonconducting.

It will be obvious to one having ordinary skill in the art that several changes may be made in the details of the above-described preferred embodiment of the present invention without departing from the spirit of the invention. Therefore, the scope of the present invention should only be determined by the following claims.

I claim:
1. A noise suppressor circuit, comprising:
 a first NPN type gating transistor connected as a common emitter amplifier;
 a second PNP type gating transistor connected as a common emitter amplifier with the bases of said gating transistors connected to a common signal input terminal;
 a first PNP type amplifier transistor connected as an emitter follower amplifier, with the emitter of said first amplifier transistor connected to the collector of said first gating transistor;
 a second PNP type amplifier transistor connected as a common emitter amplifier, with the collector of said second amplifier transistor connected to the collector of said second gating transistor and the bases of said amplifier transistors connected to a common pulse input terminal;
 a first common load resistor connected to the collector of said first gating transistor and to the emitter of said first amplifier transistor.
 a second common load resistor connected to the collector of said second gating transistor and to the collector of said second amplifier transistor;
 a first coupling capacitor having one plate connected to the emitter of said first amplifier transistor;
 a second coupling capacitor having one plate connected to the collector of said second amplifier transistor;
 a first coupling diode connected at its anode to the other plate of said first coupling capacitor;
 a second coupling diode connected at its cathode to the other plate of said second coupling capacitor;
 a first limiting diode connected at its cathode to said other plate of said first coupling capacitor and at its anode to a lower limit D.C. reference voltage;
 a second limiting diode connected at its anode to said other plate of said second coupling capacitor and at its cathode to an upper limit D.C. reference voltage; and
 a memory capacitor having one plate connected in common with the cathode of said first coupling diode and the anode of said second coupling diode and having its other plate connected to ground, so that when a plurality of standard voltage pulses are applied to said pulse input terminal an input signal applied to said signal input terminal is reproduced as a stair-step output signal across said storage capacitor which is substantially free from noise.

2. A noise suppressor circuit, comprising:
 a pair of first and second switching means connected so that one of said switching means is conducting and the other is nonconducting;
 a first input terminal connected to the inputs of each of said switching means in order to reverse the conducting condition of each of said switching means when in input signal applied to said first input terminal reaches a predetermined amplitude;
 a storage means for storing electrical charge;

a pulse means for supplying a plurality of standard voltage pulses; and means connecting said pulse means through two different circuit paths to said storage means, to said first switching means through one of said paths and to said second switching means through the other of said paths, for transmitting said voltage pulses as pulses of one polarity through one of said paths and as pulses of the opposite polarity through the other of said paths either to said storage means or through said pair of switching means depending upon the conductive condition of said switching means to produce a stairstep voltage on said storage means.

3. A noise suppressor circuit, comprising:

a pair of first and second switching means connected so that one of said switching means is conducting and the other is nonconducting;

a first input terminal connected to the inputs of both of said switching means in order to reverse the conducing condition of each of said switching means when an input signal applied to said first input terminal reaches a predetermined amplitude;

a storage capacitor;

a second input terminal; and means connecting said second input terminal through two different circuit paths to said storage capacitor, to said first switching means through one of said paths and to said second switching means through the other of said paths, for transmitting standard voltage pulses applied to said second input terminal as pulses of one polarity through one of said paths and as pulses of the opposite polarity through the other of said paths either to said storage capacitor or through said pair of switching means depending upon the conductive condition of said pair of switching means to produce a stairstep voltage on said storage capacitor.

4. A noise suppressor circuit, comprising:

a pair of first and second switching means connected so that one of said switching means is conducting and the other is nonconducting;

a first input terminal connected to the inputs of both of said switching means in order to reverse the conducting condition of each of said switching means when an input signal applied to said first input terminal reaches a predetermined amplitude;

a storage capacitor;

a second input terminal;

means connecting said second input terminal through two different circuit paths to said storage capacitor, to said first switching means through one of said paths and to said second switching means through the other of said paths for transmitting standard voltage pulses applied to said second input terminal either to said storage capacitor or through said pair of switching means depending upon the conductive condition of said switching means;

an inverter means connected in one of said paths, between said second input terminal and said storage capacitor to reverse the polarity of the voltage pulses transmitted along said one path;

a pair of first and second gating means each connected in a different one of said paths, said first gating means connected between the output of said inverter means and said storage capacitor and said second gating means connected between the input of said second switching means and said storage capactor, in order to transmit voltage pulses of different polarity to said storage capacitor depending upon the conductive condition of said pair of switching means to produce a stairstep voltage on said storage capacitor; and an output signal generator means having its input connected to said storage capacitor to cause said signal generator to produce an output signal when said stairstep voltage reaches a predetermined level corresponding to that produced by a plurality of consecutive voltage pulses of the same polarity.

5. A trigger generator having a noise suppressor circuit, comprising:

a pair of first and second switching means connected so that one of said switching means is conducting and the other is nonconducting;

a voltage comparator circuit having its output connected to the inputs of each of said switching means in order to reverse the conducting condition of each of said switching means when an input signal applied to one input terminal of said comparator circuit exceeds a reference voltage applied to another input terminal of said comparator circuit;

a storage means for storing electrical charge;

a third input terminal;

means connecting said third input terminal through two different circuit paths to said storage means, to said first switching means through one of said paths and to said second switching means through the other of said paths, for transmitting standard voltage pulses applied to said third input termianl either to said storage means or through one or the other of said pair of switching means depending upon the conductive condition of said switching means;

an inverter amplifier connected in one of said paths, between said second input terminal and said storage means to reverse the polarity of the voltage pulses transmitted along said one path;

a pair of first and second gating means each connected in a different one of said paths, said first gating means connected between the output of said inverter amplifier and said storage means and said second gating means connected between said second switching means and said storage means, in order to transmit voltage pulses of different polarity to said storage means depending upon the conductive condition of said pair of switching means to produce a stairstep voltage on said storage means;

a pair of voltage limiting means each connected to a different one of said gating means to set an upper limit voltage and a lower limit voltage for said stairstep voltage; and a multivibrator having its input connected to said storage means to cause said multivibrator to produce an output signal when said stairstep voltage reaches a predetermined level corresponding to that produced by a plurality of consecutive voltage pulses of the same polarity.

6. A noise suppressor circuit, comprising:

a pair of first and second gating transistors;

a common signal input terminal connected to the inputs of both said gating transistors;

a signal follower amplifier transistor having its output connected to the output of said first gating transistor;

a signal inverter amplifier transistor having its output connected to the output of said second gating transistor;

a common pulse input terminal connected to the inputs of both of said amplifier transistors;

a first common load resistor connected to the outputs of said first gating transistor and said follower amplifier transistor;

a second common load resistor connected to the outputs of said second gating transistor and said inverter amplifier transistor;

a first coupling capacitor having one plate connected to the output of said follower amplifier transistor;

a second coupling capacitor having one plate connected to the output of said inverter amplifier transistor;

a first coupling diode having its input connected to the other plate of said first coupling capacitor;

a second coupling diode of opposite polarity to said first coupling diode, having its input connected to the other plate of said second coupling capacitor;

a first limiting diode connected between ground and said other plate of said first coupling capacitor;

a second limiting diode connected between ground and said other plate of said second coupling capacitor; and a memory capacitor connected between the outputs of said coupling diodes and ground.

7. A noise suppressor circuit, comprising:

a pair of first and second gating transistors;

a common signal input terminal connected to the inputs of both of said gating transistors;

a signal follower amplifier transistor having its output connected to the output of said first gating transistor;

a signal inverter amplifier transistor having its output connected to the output of said second gating transistor;

a common pulse input terminal connected to the inputs of both of said amplifier transistors;

a first common load resistor connected to the outputs of said first gating transistor and said follower amplifier transistor;

a second common load resistor connected to the output of said second gating transistor and said inverter amplifier transistor;

a first coupling diode connected at its input to the output of said signal follower amplifier transistor;

a second coupling diode of opposite polarity to said first diode connected at its input to the output of said inverter amplifier transistor;

a memory capacitor connected between the outputs of both of said coupling diodes and ground, so that when a plurality of standard voltage pulses are applied to said pulse input terminal an input signal applied to said signal input terminal causes a stairstep voltage to be produced across said storage capacitor by said pulses;

a vacuum tube connected as a cathode follower, with the grid of said tube connected to said one plate of said memory capacitor;

a third load resistance connected to the cathode of said tube; and a bistable multivibrator having its input connected to said third load resistance, said multivibrator being biased in a low voltage stable state so that the signal current transmitted through said tube does not trigger said multivibrator to a high voltage stable state until the stairstep voltage across said memory capacitor exceeds a voltage level corresponding to several successive pulses of the same polarity.

8. A noise suppressor circuit, comprising:

a first gating transistor connected as a common emitter amplifier;

a second gating transistor connected as a common emitter amplifier;

a common signal input terminal connected to the bases of said gating transistors;

a first amplifier transistor connected as an emitter follower amplifier, with the emitter of said first amplifier transistor connected to the collector of said first gating transistor;

a second amplifier transistor connected as a common emitter amplifier, with the collector of said second amplifier transistor connected to the collector of said second gating transistor;

a common pulse input terminal connected to the bases of said amplifier transistors;

a first common load resistor connected to the collector of said first gating transistor and to the emitter of said first amplifier transistor;

a second common load resistor connected to the collector of said second gating transistor and to the collector of said second amplifier transistor;

a first coupling capacitor having one plate connected to the emitter of said first amplifier transistor;

a second coupling capacitor having one plate connected to the collector of said second amplifier transistor;

a first coupling diode connected at its anode to the other plate of said first coupling capacitor;

a second coupling diode connected at its cathode to the other plate of said second coupling capacitor;

a first limiting diode connected at its cathode to said other plate of said first coupling capacitor anode connected to a lower limit D.C. reference voltage;

a second limiting diode connected at its anode to said other plate of said second coupling capacitor and its cathode connected to an upper limit D.C. reference voltage;

a memory capacitor having one plate connected in common with the cathode of said first coupling diode and the anode of said second coupling diode and having its other plate connected to ground, so that when a plurality of standard voltage pulses are applied to said pulse input terminal a change in polarity of an input signal applied to said signal input terminal causes a stairstep voltage to be produced across said storage capacitor by said pulses;

a vacuum tube connected as a cathode follower, with the grid of said tube connected to said one plate of said memory capacitor;

a third load resistance connected to the cathode of said tube; and a tunnel diode connected as a bistable multivibrator with its input connected across a portion of said third load resistance, said tunnel diode being biased in a low voltage stable state so that the current through said tunnel diode does not exceed its peak current to trigger said tunnel diode to a high voltage stable state until the stairstep voltage across said memory capacitor exceeds a voltage level corresponding to several successive pulses of the same polarity.

No references cited.

ARTHUR GAUSS, *Primary Examiner.*

JOHN W. HUCKERT, *Examiner.*